UNITED STATES PATENT OFFICE.

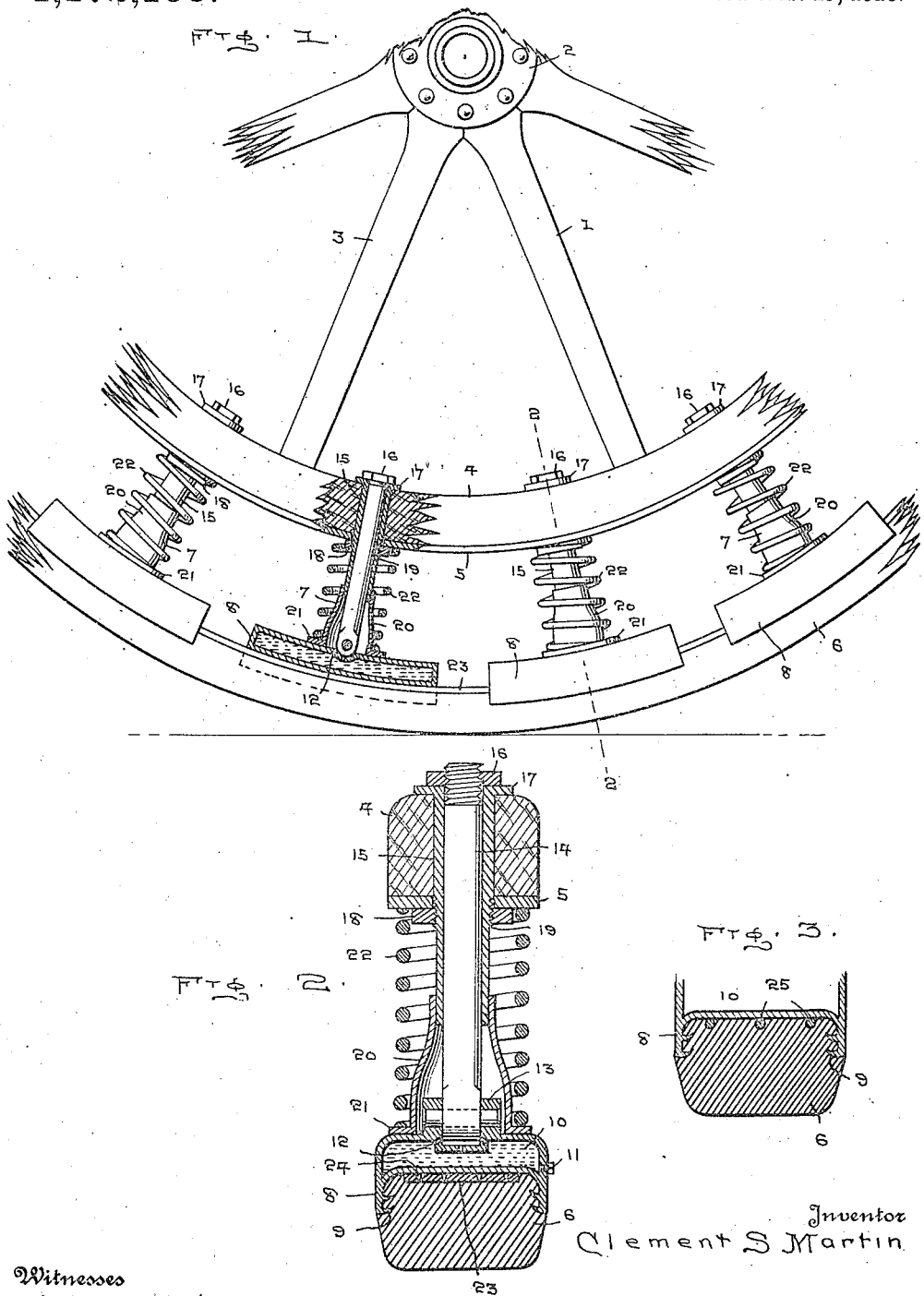

CLEMENT S. MARTIN, OF ROCKVILLE, MARYLAND.

CUSHIONING MEANS FOR VEHICLE-WHEELS.

1,172,153.  Specification of Letters Patent. Patented Feb. 15, 1916.

Application filed July 26, 1915. Serial No. 42,057.

*To all whom it may concern:*

Be it known that I, CLEMENT S. MARTIN, a citizen of the United States, residing at Rockville, in the county of Montgomery and State of Maryland, have invented certain new and useful Improvements in Cushioning Means for Vehicle-Wheels; and I do hereby declare the following to be a full, clear, and exact description of the invention, such as will enable others skilled in the art to which it appertains to make and use the same.

My invention relates to new and useful improvements in cushioning means for vehicle wheels, and my object is to provide a cushion tire in connection with the ordinary wooden wheel and provide means for attaching the same to the wheel.

A further object is to provide yielding means for connecting the cushion tire to the wheel.

A further object is to provide cushioning springs for the connecting means. And a further object is to provide means for lubricating the movable parts of the connecting means.

Other objects and advantages will be hereinafter set forth and more particularly pointed out in the accompanying specification.

In the accompanying drawings which are made a part of this application, Figure 1 is a fragmentary elevation partly in section showing the manner of attaching my improved device to an ordinary wheel. Fig. 2 is an enlarged detail sectional view as seen on line 2, 2 of Fig. 1, and Fig. 3 is a detail cross sectional view through the cushion tire and parts of the securing means showing a modified form of device.

Referring to the drawings in which similar reference numerals designate corresponding parts throughout the several views, 1 indicates a wheel of the ordinary construction comprising a hub 2, spokes 3, a felly 4 and a metal rim 5 all of the ordinary or any preferred structure. Surrounding the rim 5 and spaced a distance therefrom is a cushion tire 6 preferably of solid rubber, which tire is connected to the felly 4 of the wheel through the medium of connecting members 7, each member comprising an elongated shoe 8 which is preferably channel shape and fits over and engages the inner face of the cushion tire 6 and the side faces of the tire, the flange portion of the shoe having inturned ribs 9 thereon which embed in the cushion tire and prevent the shoes from disengagement with the tire.

Each shoe is provided with a tank 10 for the reception of lubricating oil, said oil being entered through a tap 11 in the wall of the tank and gradually seeps through ports 12 onto parts of the connecting member so as to thoroughly lubricate the working parts thereof. Pivotally attached at one end between ears 13 on the wall of the tank 10 is a bar or bolt 14, the inner end of the bar extending through a tubular socket 15 carried by the felly 4 of the wheel, and is threaded to receive a nut 16 by means of which the movement of the bar within the socket is assured without the bar leaving the socket. The extreme inner end of the socket 15 is provided with a flange 17 which rests on the inner face of the felly, the length of the socket being such as to project a distance beyond the rim 5 of the wheel and the socket is held in fixed relation with the wheel by engaging a nut 18 with threads 19 on the outer surface of the socket, said nut binding against the rim 5 and drawing the flange 17 against the inner face of the felly. Surrounding the outer end of the tubular socket 15 is a cap 20 which is substantially funnel shaped or enlarged at its outer end, the restricted end of the cap fitting snugly around the end of the socket 15 to prevent dust, water, or the like, from entering between the cap and socket and also to prevent the oil from passing therebetween, the extreme outer end of the cap having a flange 21 which rests against the face of the tank 10, thus forming a complete housing for the end of the tubular socket and the pivoted end of the bar 14.

Surrounding the protruding end of the tubular socket 15 and the cap 20 is a cushioning spring 22, one end of the spring resting against the rim 5 and the opposite end thereof against the flange 21 of the cap 20, said spring serving to hold the cap securely seated against the tank 10 and also serving to cushion any blow that is received by the cushion tire so as to prevent the jar incident thereto from being transmitted to the hub of the wheel, the tension of said spring being such as to normally hold the cushioning tire concentric with the rim of the wheel 1.

In order to prevent undue seepage of the oil from the tank the ports 12 are so placed that the ends thereof will be intermittently covered by the pivoted end of the bar 14, said end fitting over the ports in such manner as to prevent the passage of the oil except at such time as the bar 14 is moved on its pivot, in which event the oil will only leave the tank when the wheel is in operation and then only in such quantities as to be fully absorbed by the working parts of the connecting members.

To prevent the cushioning tire from undue stretching at its central portion whereby the same might yield sufficiently to disengage from the ribs 9, a band 23 of flexible material, preferably leather, is embedded in the inner face of the cushioning tire and secured thereto in any preferred manner as by being glued, said band extending entirely around the tire and having its ends secured together, thus preventing undue stretching of the cushioning tire.

To guard against creeping action of the shoes upon the cushioning tire 6 the faces of the shoe may be provided with prongs 24 which embed themselves in the band 23, and when so embedded the shoes will be held against creeping or longitudinal movement on the cushioning tire.

Instead of using the band 23 for holding the tire against stretching at its central portion, a plurality of wire bands 25 may be embedded in the tire which will serve to hold the tire against stretching, although it will be understood that I prefer to use the leather band as previously described.

This form of device can be attached to the usual make of vehicle wheel, thus converting the same from a solid wheel to a cushion wheel, and it will be readily seen that when a blow is encountered by the cushion tire, the springs 22 will yield and absorb the shock as the bars 14 are moved endwise, thus eliminating the shock from the wheel proper. It will also be seen that the device can be attached to the wheel at a minimum expense and by providing the lubricating chambers, undue rattling or wear of the movable parts will be eliminated.

Having thus fully described my invention what I claim as new and desire to secure by Letters Patent of the United States, is:—

1. The combination with a wheel having a felly, of a cushion tire, a plurality of shoes adapted for engagement with the tire, a bar pivoted to each shoe, tubular sockets extending through the felly and each receiving the free end of one of the bars, a flange formed on each of said sockets, a nut carried by each of said sockets for locking the sockets in engagement with the felly, a flared cap upon each of the bars and having one of its ends resting on the adjacent shoe and its opposite end engaging the end of the adjacent socket, and a spring extending from each of the shoes to the felly and surrounding the respective socket and cap thereof, the outer ends of the springs engaging the caps to hold the said caps seated upon the shoes.

2. The combination with a wheel having a felly, of a cushion tire, a plurality of shoes engaging said tire, a lubricant containing tank formed on each of said shoes, a bar pivotally mounted on each of said shoes and connecting said shoes with the felly of the wheel, said tanks having ports leading to said bars for lubricating the said bars.

3. A cushioning attachment for wheels, comprising a cushion tire, a plurality of spaced shoes engaging said tire, a lubricant containing tank on each of said shoes, a bar pivotally mounted on each of said shoes, tubular sockets on said wheel, each adapted to receive the free end of one of the bars, a cap surrounding one end of each of the sockets and having its opposite end resting against the adjacent shoe, a cushioning spring surrounding each of the tubular sockets and caps, each of said tanks having ports leading to the adjacent bar for lubricating the same.

In testimony whereof I have signed my name to this specification in the presence of the subscribing witness.

CLEMENT S. MARTIN.

Witness:
C. A. NEALE.